United States Patent
Kim

(10) Patent No.: US 8,423,904 B2
(45) Date of Patent: Apr. 16, 2013

(54) MOBILE TERMINAL AND CONTROL METHOD THEREOF

(75) Inventor: Jun-Hee Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 12/361,725

(22) Filed: Jan. 29, 2009

(65) Prior Publication Data

US 2010/0100842 A1   Apr. 22, 2010

(30) Foreign Application Priority Data

Oct. 17, 2008   (KR) ........................ 10-2008-0102221

(51) Int. Cl.
*G06F 3/048* (2006.01)
(52) U.S. Cl.
USPC .......................................... 715/808; 715/809
(58) Field of Classification Search .................. 715/708, 715/709, 808, 809
See application file for complete search history.

(56) References Cited

U.S. PATENT DOCUMENTS

| | | | | |
|---|---|---|---|---|
| 6,459,440 B1 * | 10/2002 | Monnes et al. | ............... | 715/808 |
| 7,162,739 B2 * | 1/2007 | Cowden et al. | ................ | 726/22 |
| 2003/0098882 A1 * | 5/2003 | Cowden et al. | ............... | 345/781 |
| 2003/0233482 A1 * | 12/2003 | Skrepetos | ...................... | 709/250 |
| 2005/0114207 A1 * | 5/2005 | Jania | ................. | 705/14 |
| 2006/0095860 A1 * | 5/2006 | Wada et al. | .................... | 715/771 |
| 2006/0136504 A1 * | 6/2006 | Babutzka et al. | ............. | 707/201 |
| 2006/0265417 A1 * | 11/2006 | Amato et al. | ................. | 707/102 |
| 2006/0282795 A1 * | 12/2006 | Clark et al. | ................... | 715/840 |
| 2007/0192734 A1 * | 8/2007 | Berstis et al. | ................. | 715/808 |
| 2007/0266338 A1 * | 11/2007 | Shirai | ......................... | 715/808 |
| 2008/0165141 A1 * | 7/2008 | Christie | ........................ | 345/173 |
| 2009/0006956 A1 * | 1/2009 | Bae et al. | ...................... | 715/708 |
| 2009/0228919 A1 * | 9/2009 | Zott et al. | ........................ | 725/34 |
| 2010/0057566 A1 * | 3/2010 | Itzhak | ........................ | 705/14.53 |
| 2010/0281376 A1 * | 11/2010 | Meaney et al. | ............... | 715/723 |

* cited by examiner

*Primary Examiner* — Omar Abdul-Ali
*Assistant Examiner* — Anil Bhargava
(74) *Attorney, Agent, or Firm* — Lee, Hong, Degerman, Kang & Waimey

(57) ABSTRACT

Disclosed are a mobile terminal capable of executing web browsing with consideration of a user's convenience, and a control method thereof. The mobile terminal comprises: a wireless communication unit which accesses any web page; a display module for displaying the accessed web page; and a controller for automatically displaying popup windows in a virtual space when the accessed web page has any popup windows. Popup windows can be hidden at the time of web browsing, and the hidden popup windows can be displayed according to a user's necessity. This enhances the user's convenience.

6 Claims, 17 Drawing Sheets

FIG. 5
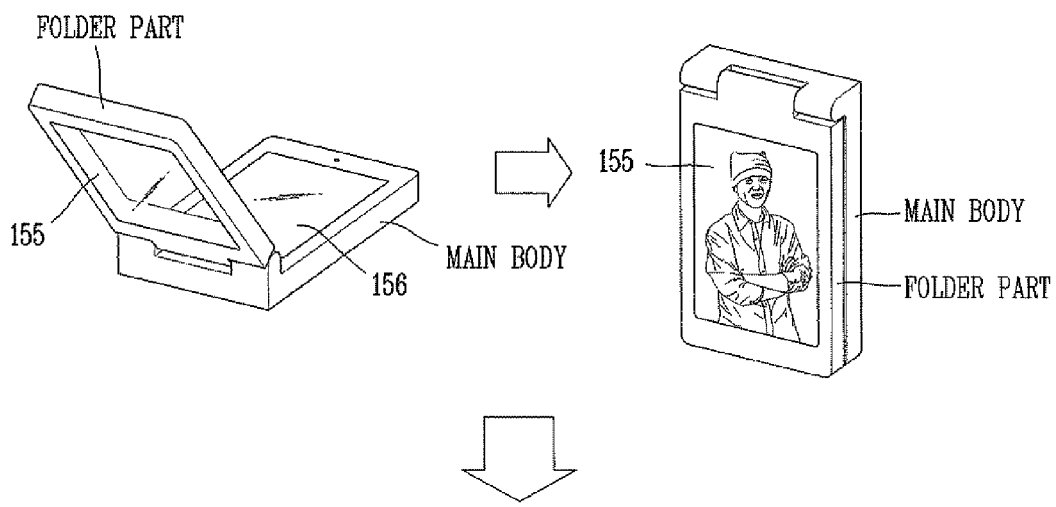
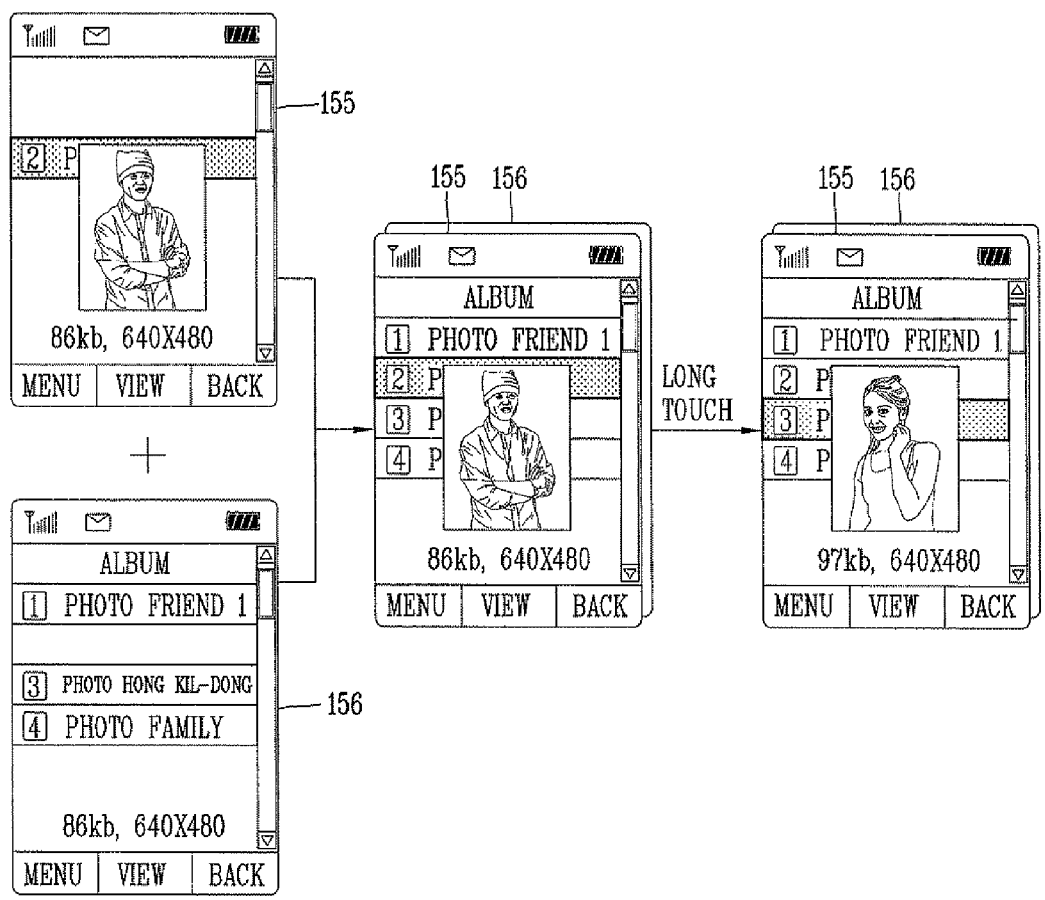

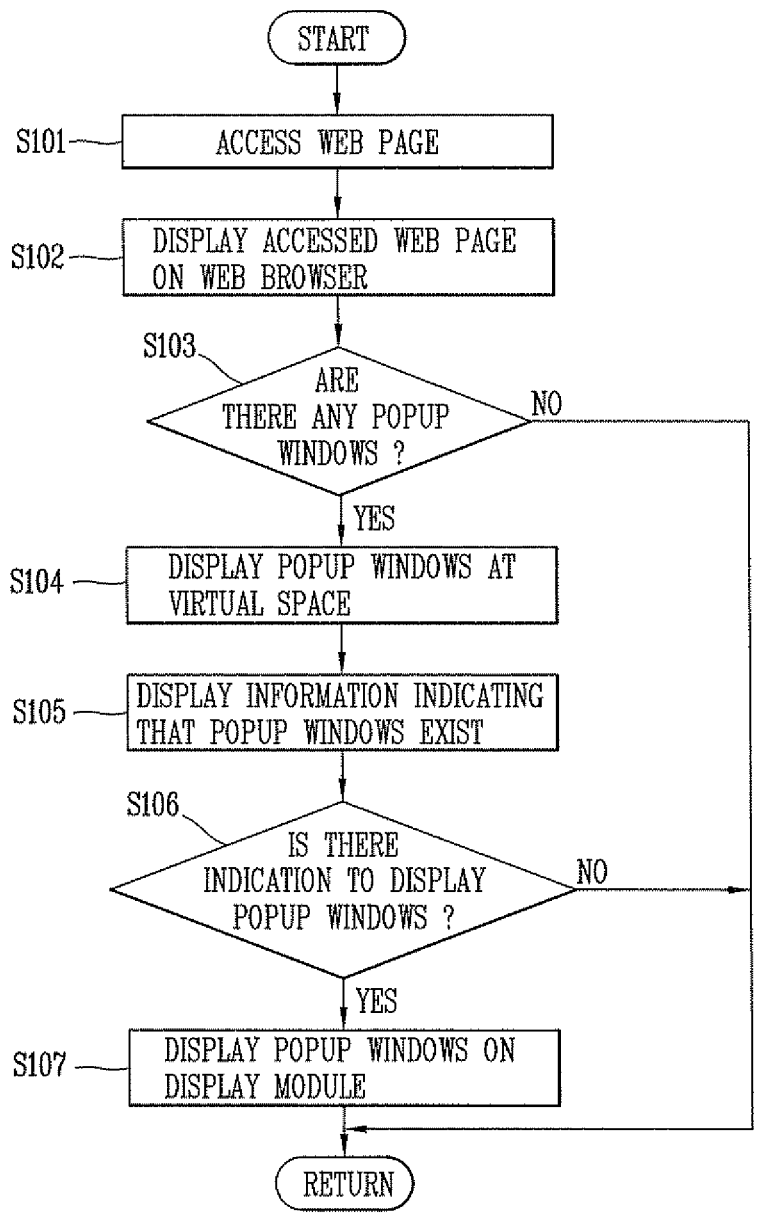

MOBILE TERMINAL AND CONTROL METHOD THEREOF

CROSS-REFERENCE TO RELATED APPLICATIONS

Pursuant to 35 U.S.C. §119 this application claims the benefit of earlier filing date and right of priority to Korean Application No. 10-2008-0102221, filed on Oct. 17, 2008, the contents of which are incorporated by reference herein in their entirety.

BACKGROUND OF THE INVENTION

1. Field of the Invention

The present invention relates to a mobile terminal capable of executing web browsing with consideration of a user's convenience.

2. Background of the Invention

In general, a terminal may be classified into a mobile (portable) terminal and a stationary terminal according to a moveable state. The terminal may be also classified into a handheld terminal and a vehicle mount terminal according to a user's carriage method.

The terminal is implemented as a multimedia player provided with various and composite functions such as capturing still or moving images, reproducing music or moving image files, games, and broadcasting reception.

In order to support and enhance functions of the terminal, structural and/or software parts of the terminal are required to be upgraded.

Recently, radio Internet access using a mobile terminal can be implemented. And, various types of mobile terminals having resolution high enough to perform a full browsing are being presented out. Here, the full browsing indicates that an Internet web site displayed on a computer screen is displayed on a mobile terminal screen without format conversion.

However, the mobile terminal having a small display module has the following problems. When a plurality of popup windows are displayed on the display module of the mobile terminal at the time of web browsing, the entire screen of the mobile terminal may be blocked. This may degrade a user's convenience. Accordingly, a method for enhancing a user's convenience at the time of using a web browsing function is required.

SUMMARY OF THE INVENTION

Therefore, an object of the present invention is to provide a mobile terminal capable of automatically displaying popup windows on a web page in a virtual space when the web page has any popup windows at the time of accessing the web page for display.

To achieve these and other advantages and in accordance with the purpose of the present invention, as embodied and broadly described herein, there is provided a mobile terminal, comprising: a wireless communication unit which accesses any web page; a display module for displaying the accessed web page; and a controller for automatically displaying popup windows in a virtual space when the accessed web page has any popup windows.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a conceptual view showing a method for controlling a touch operation in an overlapped state between one pair of display units;

FIG. 7 is a flowchart showing a method for hiding popup windows displayed when a web page is opened according to the present invention;

DETAILED DESCRIPTION OF THE INVENTION

Description will now be given in detail of the present invention, with reference to the accompanying drawings.

A first object of the present invention is to provide a mobile terminal capable of hiding popup windows when displaying a web page (or a web site) in a mobile terminal having a web browsing function, and a control method thereof.

A second object of the present invention is to provide a mobile terminal capable of hiding popup windows when displaying a web page (or web site) in a mobile terminal having a web browsing function, and capable of selectively displaying the hidden popup windows, and a control method thereof.

A third object of the present invention is to provide a mobile terminal capable of displaying popup windows in a virtual space when displaying a web page (or web site) in a mobile terminal having a web browsing function, and a control method thereof.

A fourth object of the present invention is to provide a mobile terminal capable of hiding popup windows by displaying the popup windows on a sub-layer when displaying a web page (or web site) in a mobile terminal having a web browsing function, and a control method thereof.

A fifth object of the present invention is to provide a mobile terminal capable of hiding popup windows when displaying a web page (or web site) in a mobile terminal having a web browsing function, and capable of displaying information relating to the popup window, and a control method thereof.

A sixth object of the present invention is to provide a mobile terminal capable of hiding popup windows when displaying a web page (or web site) in a mobile terminal having a web browsing function, and capable of displaying popup windows selected by a user on a preview screen, and a control method thereof.

Hereinafter, a mobile terminal according to the present invention will be explained in more detail with reference to the attached drawings. The suffixes attached to components of the mobile terminal, such as 'module' and 'unit' were used for facilitation of the detailed description of the present invention. Therefore, the suffixes do not have different meanings from each other.

The mobile terminal according to the present invention may include a portable phone, a smart phone, a laptop computer, a digital broadcasting terminal, Personal Digital Assistants (PDA), a Portable Multimedia Player (PMP), a navigation, etc. It is obvious to those skilled in the art that the preferred embodiments of the present invention can be applied not only to mobile terminals, but also to stationary terminals such as a digital TV and a desk top.

Figure 1:
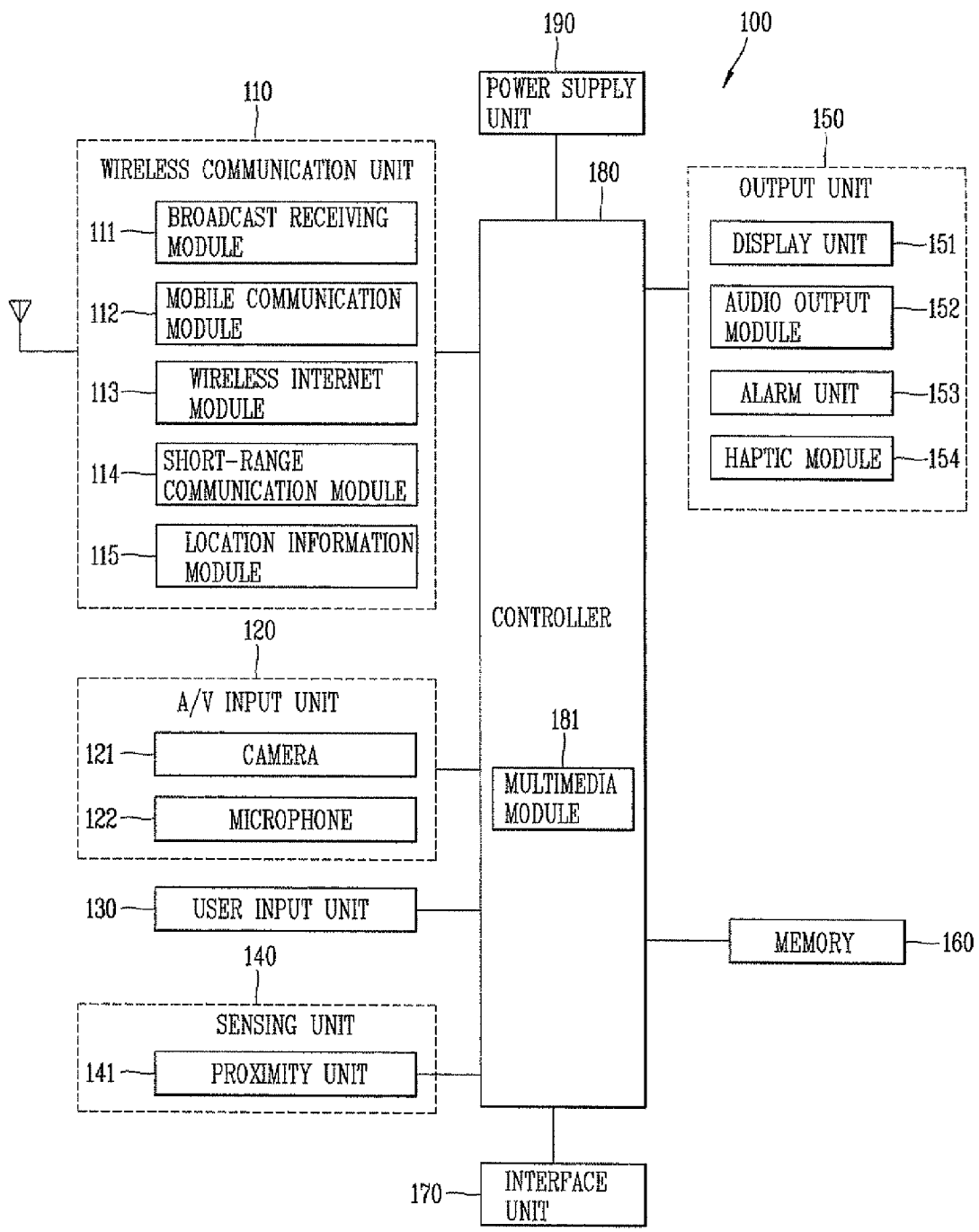
FIG. 1 is a block diagram showing a mobile terminal according to a first embodiment of the present invention.

FIG. 1 is a block diagram showing a mobile terminal according to a first embodiment of the present invention.

As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply unit 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display unit 151 that visually displays information associated with the mobile terminal 100. For instance, if the mobile terminal 100 is operating in a phone call mode, the display unit 151 will generally provide a user interface or graphical user interface which includes information associated with placing, conducting, and terminating a phone call. As another example, if the mobile terminal 100 is in a video call mode or a photographing mode, the display unit 151 may additionally or alternatively display images which are associated with these modes.

Further, the display unit 151 also preferably includes a touch screen working in cooperation with an input device, such as a touchpad. This configuration permits the display unit 151 to function both as an output device and an input device. In addition, the display unit 151 may be implemented using display technologies including, for example, a liquid crystal display (LCD), a thin film transistor-liquid crystal display (TFT-LCD), an organic light-emitting diode display (OLED), a flexible display and a three-dimensional display. Some of the above display units may be configured as transparent or transmissive type of display units. These display units may be referred to as 'transparent display units', and include a Transparent OLED (TOLED) as a representative example. The display unit may also be configured to have a transmissive rear structure. This structure allows a user to view an object positioned at a rear side of the terminal body through the display unit 151.

The mobile terminal 100 may also include one or more of such display units 151. An example of a two-display embodiment is one in which one display is configured as an internal display (viewable when the terminal is in an opened position) and a second display configured as an external display (viewable in both the open and closed positions).

When the display unit 151 and a sensor to sense a touch operation (hereinafter, will be referred to as 'touch sensor') have a structure to be layered with each other, the display unit 151 may serve as an input device as well as an output device. The touch sensor may be implemented as a touch film, a touch sheet, a touch pad, and so on.

The touch sensor may be configured to convert changes of a pressure applied to a specific portion of the display unit 151, or changes of a capacitance occurring from a specific portion of the display unit 151, into electric input signals. The touch sensor may be configured to sense not only a touch position and a touch area, but also a touch pressure.

Once touch inputs are sensed by the touch sensor, corresponding signals are transmitted to a touch controller. The touch controller processes the signals, and then transmits corresponding data to the controller 180. Accordingly, the controller 180 can sense a touch position on the display unit 151.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electric field or infrared rays without a mechanical contact. The proximity sensor has a longer lifespan and a more enhanced utilization degree than a contact sensor.

The proximity sensor may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electric field. In this case, the touch screen (touch sensor) may be categorized into a proximity sensor.

Hereinafter, a status that the pointer is positioned to be proximate onto the touch screen without contact will be referred to as 'proximity touch', whereas a status that the pointer substantially comes in contact with the touch screen will be referred to as 'contact touch'. The pointer in a status of 'proximity touch' is positioned so as to be vertical with respect to the touch screen.

The proximity sensor senses proximity touch, and proximity touch patterns (e.g., distance, direction, speed, time, position, moving status, etc.). Information relating to the sensed proximity touch, and the sensed proximity touch patterns may be output onto the touch screen.

An audio output module 152 may output audio data received from the wireless communication unit 110 or stored in the memory 160, in a call-receiving mode, a call-placing mode, a recording mode, a voice recognition mode, a broadcast reception mode, a route guidance mode, and so on. The audio output module 152 may output audio signals relating to functions performed in the mobile terminal 100, e.g., call signal reception sound and message reception sound. The audio output module 152 may include a receiver, a speaker, a buzzer, and so on.

An alarm unit 153 outputs signals notifying occurrence of events from the mobile terminal 100. The events occurring from the mobile terminal 100 may include call signal reception, message reception, a key signal input, a touch input, and so on. The alarm unit 153 may output not only video or audio signals, but also other types of signals such as signals notifying occurrence of events in a vibration manner. The video or audio signals may be output through the display unit 151 or the audio output module 152. Accordingly, the display unit 151 and the audio output module 152 may be categorized into some parts of the alarm unit 153.

An haptic module 154 generates various tactile effects. A representative example of the tactile effects generated by the haptic module 154 includes vibration. Vibration generated by the haptic module 154 may have a controllable strength, a controllable pattern, and so on. For instance, different vibration may be output in a synthesized manner or in a sequential manner.

The haptic module 154 may generate various tactile effects including not only vibration, but also arrangement of pins vertically moving with respect to a skin surface contacting the haptic module 154, air injection force or air suction force through an injection hole or a suction hole, touch by a skin surface, presence or absence of contact with an electrode, effects by stimulus such as an electrostatic force, and reproduction of cold or hot feeling using a heat absorbing device or a heat emitting device.

The haptic module 154 may be configured to transmit tactile effects through a user's direct contact, or a user's muscular sense using a finger or a hand. The haptic module 154 may be implemented in two or more in number according to a configuration of the mobile terminal 100.

The memory 160 may store programs to operate the controller 180, or may temporarily store input/output data (e.g., phonebook, messages, still images, moving images, etc.). The memory 160 may store data relating to vibration and sound of various patterns output when touches are input onto the touch screen.

The memory 160 may be implemented using any type or combination of suitable memory or storage devices including a flash memory type, a hard disk type, a multimedia card micro type, a card type (SD or XD memory), random access memory (RAM), static random access memory (SRAM), electrically erasable programmable read-only memory (EEPROM), programmable read-only memory (PROM), read-only memory (ROM), magnetic memory, magnetic or optical disk, or other similar memory or data storage device. The mobile terminal 100 may operate on the Internet in association with a web storage that performs a storage function of the memory 160.

The interface unit 170 interfaces the mobile terminal 100 with all external devices connected to the mobile terminal 100. The interface unit 170 receives data or power from an external device, and transmits it to each component inside the mobile terminal 100. Otherwise, the interface unit 170 transmits data inside the mobile terminal 100 to an external device. The interface unit 170 may include a wire/wireless headset port, an external charger port, a wire/wireless data port, a memory card port, a port to connect a device having an identification module to the mobile terminal 100, an audio Input/Output (I/O) port, a video Input/Output (I/O) port, an earphone port, and so on.

A recognition module is implemented as a chip to store each kind of information to identify an authorization right for the mobile terminal 100, and may include a User Identity Module (UIM), a Subscriber Identity Module (SIM), a Universal Subscriber Identity Module (USIM), and so on. A device having the recognition module (hereinafter, will be referred to as 'identification device') may be implemented as a smart card type. Accordingly, the identification device may be connected to the mobile terminal 100 through a port.

When the mobile terminal 100 is connected to an external cradle, the interface unit 170 may serve as a passage through which power from the external cradle is supplied to the mobile terminal 100, or a passage through which each kind of command signals input from the external cradle by a user are transmitted to the mobile terminal 100. Said each kind of command signals input from the external cradle, or said power may operate as signals for recognizing that the mobile terminal 100 has been precisely mounted to the external cradle.

The controller 180 control an overall operation of the mobile terminal 100. For instance, the controller 180 performs controls and processes relating to data communication, video call, voice call, etc. The controller 180 may include a multimedia module 181 configured to play multimedia. The multimedia module 181 may be implemented inside the controller 180, or may be separately implemented from the controller 180.

The controller 180 may perform a pattern recognition process to recognize handwriting inputs or picture inputs on the touch screen, as texts or images, respectively.

The power supply unit 190 may receive external power or inner power, thereby supplying the power to each component under control of the controller 180.

In addition, the above various embodiments may be implemented in a computer-readable medium using, for example, computer software, hardware, or some combination thereof.

For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in a memory (for example, the memory 160), and executed by a controller or processor (for example, the controller 180).

Figure 2A:
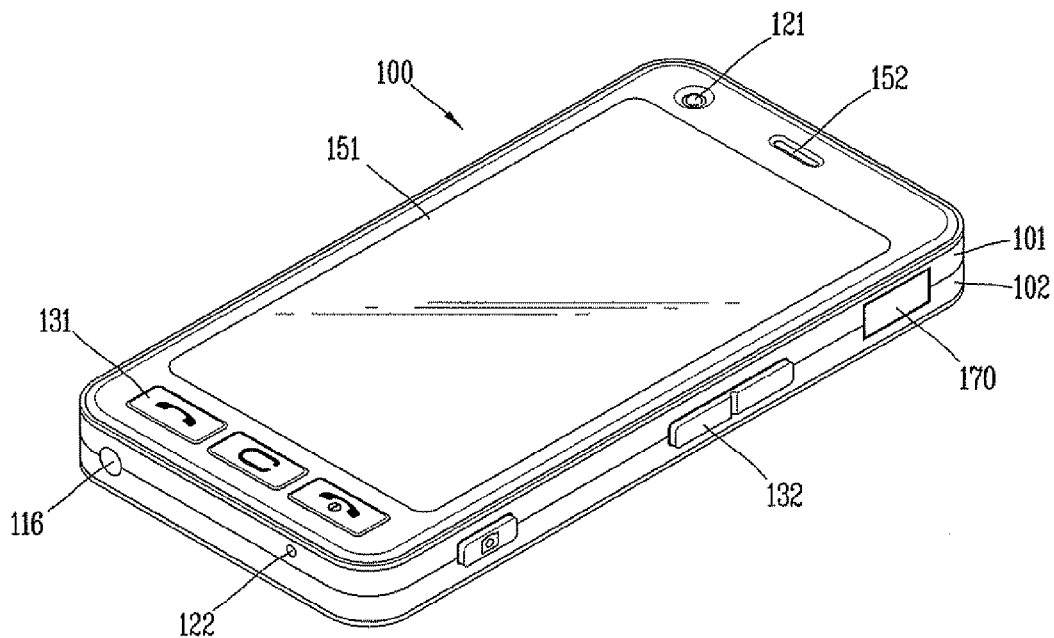
FIG. 2A is a front perspective view of the mobile terminal according to a first embodiment of the present invention.

FIG. 2A is a front perspective view of the mobile terminal according to the present invention.

The mobile terminal 100 of the present invention is provided with a bar type of terminal body. However, the mobile terminal 100 may be implemented in a variety of different configurations. Examples of such configurations include a folder-type, slide-type that two or more bodies are coupled to each other so as to perform relative motion, swing-type, swivel type, and combinations thereof.

The terminal body includes a case that forms appearance of the mobile terminal 100, such as a casing, a housing, and a cover. The case may be classified into a front case 101 and a rear case 102. Various electronic components may be disposed in a space between the front case 101 and the rear case 102. One or more intermediate cases may additionally be disposed between the front case 101 and the rear case 102.

The cases may be formed of resin in a manner of injection molding, or may be formed using metallic materials such as stainless steel (STS) and titanium (Ti).

The display unit 151, the audio output module 152, the camera 121 or the user input unit 130/131, 132, the microphone 122, the interface 170, etc. may be disposed at the front case 101 of the terminal body.

The display unit 151 occupies most parts of the front case 101. The audio output module 152 and the camera 121 are disposed at regions adjacent to one of both ends of the display unit 151, and the user input unit 131 and the microphone 122 are disposed at regions adjacent to another of both ends of the display unit 151. The user input unit 130, the interface 170, etc. may be disposed on side surfaces of the front case 101 and the rear case 102.

The user input unit 130 are manipulated to receive commands for controlling the operation of the mobile terminal 100, and may include a plurality of user input units. The user input units 131 and 132 may be referred to as manipulating portions, and may include any types as long as they can be manipulated by a user's tactile manner.

Commands input by the first and second user units 131 and 132 may be variously set. For instance, the first user input unit 131 is used for inputting commands such as START, END, SCROLL or the like, and the second user input unit 132 is used for inputting commands to control a level of sound output from the audio output unit 152, or commands to convert a current mode of the display unit 151 into a touch recognition mode.

Figure 2B:
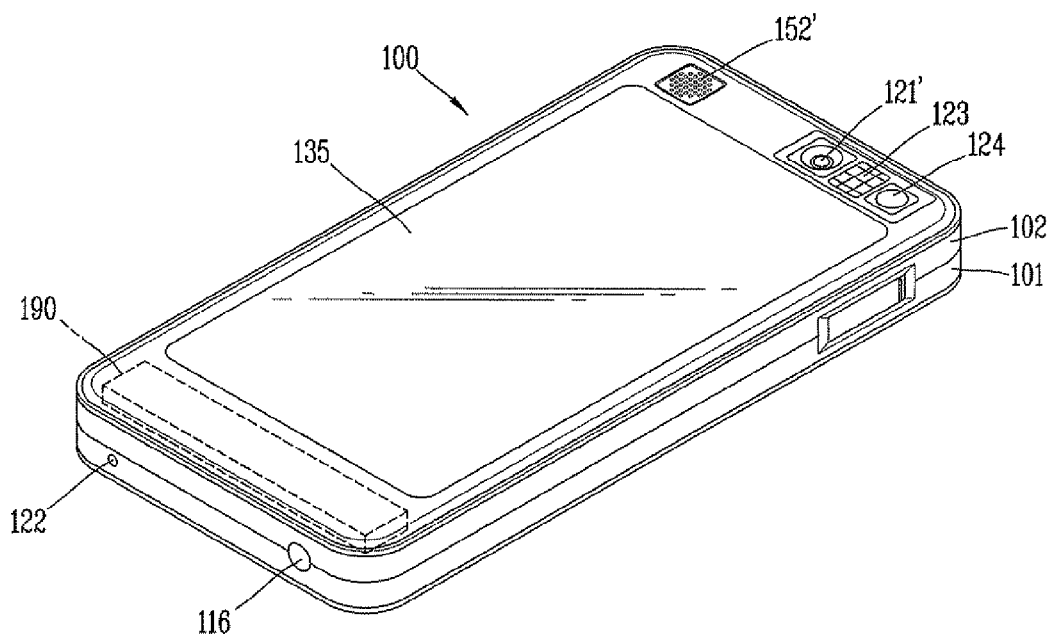
FIG. 2B is a rear perspective view of the mobile terminal according to a first embodiment of the present invention.

FIG. 2B is a rear perspective view of the mobile terminal of FIG. 2A.

Referring to FIG. 2B, a camera 121' may be additionally mounted to the rear case 102 of the terminal body. The camera 121' faces a direction which is opposite to a direction faced by the camera 121 (refer to FIG. 2A), and may have different pixels from those of the camera 121.

For example, the camera 121 is preferably configured to operate with relatively lower pixels so as to immediately transmit a user's face captured in a video call, etc. to another party, whereas the camera 121 of the second body 205 is configured to operate with relatively higher pixels such that it can be useful for a user to obtain higher quality pictures for later use. The camera 121 and 121' may be installed at the terminal body so as to be rotatable or pop-up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself or herself in a self-portrait mode.

An audio output unit 152' may be additionally disposed on a rear surface of the terminal body. The audio output unit 152' may implement a stereo function together with the audio output unit 152 of FIG. 2A, and may be used as a speaker phone in a call mode.

A broadcasting signal receiving antenna 124 as well as a calling antenna may be additionally disposed on a side surface of the terminal body. The antenna 124 constituting a part of the broadcasting receiving module 111 (refer to FIG. 1) may be installed to be retractable from the terminal body.

The power supply unit 190 for supplying power to the mobile terminal 100 is mounted to the terminal body. The power supply unit 190 may be mounted in the terminal body, or may be detachably mounted to an outer surface of the terminal body.

A touch pad 135 for sensing touch input may be additionally mounted to the rear case 102. The touch pad 135 may be also configured in a light transmissive type like the display unit 151. Here, if the display unit 151 is configured to output visual information from both surfaces thereof, the visual information can be also recognized through the touch pad 135. All of the visual information output from both surfaces of the display unit 151 may be controlled by the touch pad 135. Alternatively, as a display is additionally mounted to the touch pad 135, a touch screen may be disposed at the rear case 102.

The touch pad 135 may operate with interworking with the display unit 151 of the front case 101. The touch pad 135 may be arranged on a rear surface of the display unit 151 in parallel to the display unit 151. The touch pad 135 may have a size equal to or smaller than that of the display unit 151.

Hereinafter, with reference to FIGS. 3A and 3B, will be explained an interworking operation between the display unit 151 and the touch pad 135.

Figure 3A:
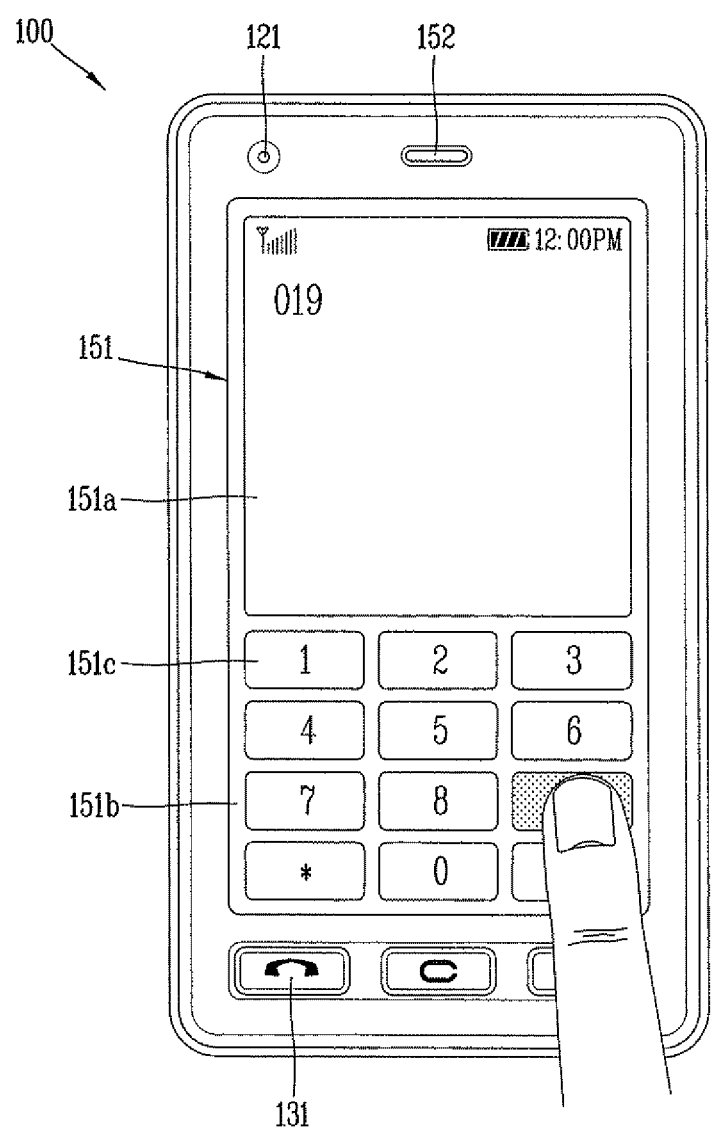
FIGS. 3A and 3B are front views of the mobile terminal to explain an operation state of the mobile terminal according to the present invention.
Figure 3B:
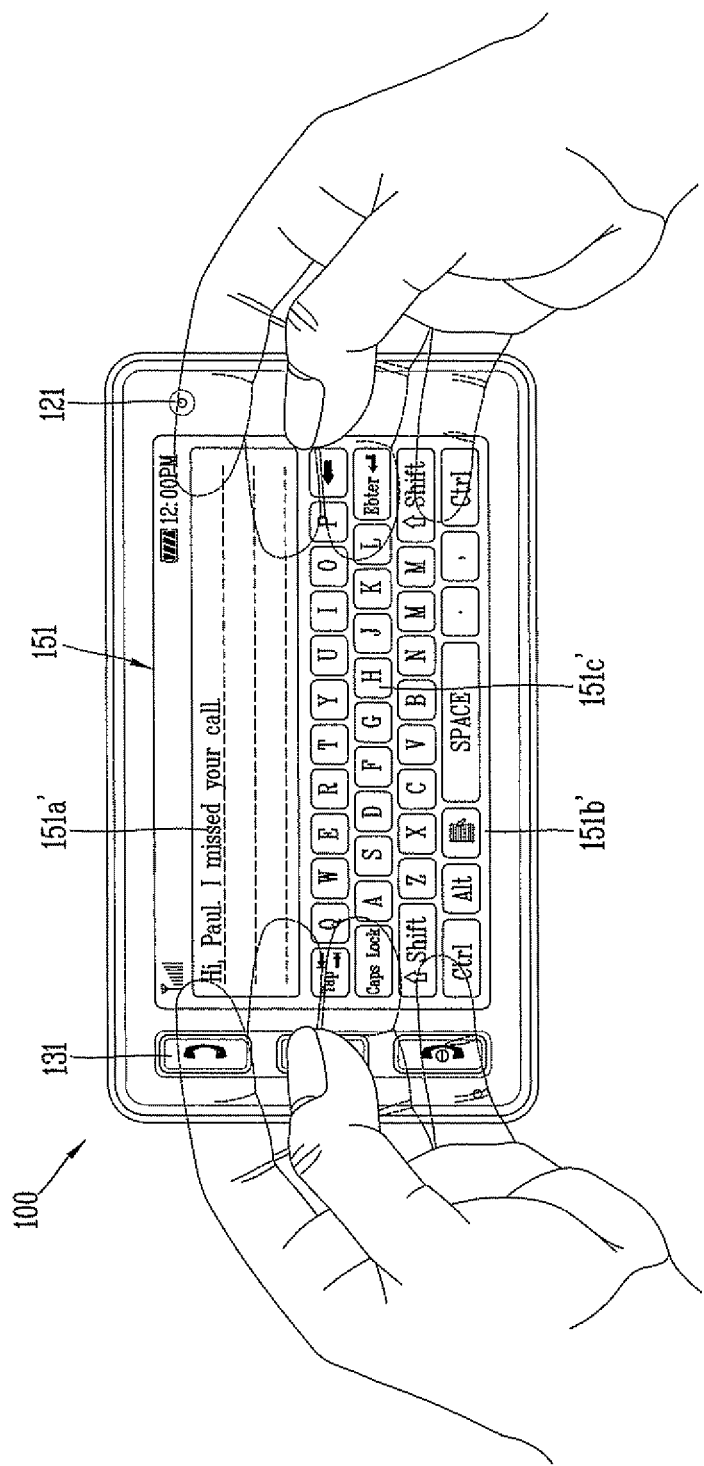

FIGS. 3A and 3B are front views of the mobile terminal to explain an operation state of the mobile terminal according to the present invention.

Various types of visual information may be displayed on the display unit 151. The information may be displayed in the form of texts, numbers, symbols, graphics, or icons.

For information input, at least one of the texts, numbers, symbols, graphics, or icons are displayed in constant arrangements, thereby being implemented as a keypad. This keypad may be referred to as 'soft keys'.

FIG. 3A shows a process that touch input applied to soft keys is received through a front surface of the terminal body.

The display unit 151 may be operated in the entire region, or in a plurality of divided regions. In the latter case, the display unit 151 may be configured such that the divided plurality of regions interwork each other.

For instance, an output window 151*a* and an input window 151*b* are respectively provided on upper and lower parts of the display unit 151. The output window 151*a* and the input unit 151*b* serve to output and input information, respectively. Soft keys 151*c* having numbers for inputting telephone numbers, etc. are implemented at the input window 151*b*. Once the soft keys 151*c* are touched, numbers, etc. corresponding to the touched soft keys are displayed on the output window 151*a*. When the first user input unit 131 is manipulated, performed is call connection to a telephone number displayed on the output window 151*a*.

FIG. 3B shows a process that touch input applied to the soft keys is received through a front surface of the terminal body.

FIG. 3A shows a portrait that the terminal body is vertically disposed, whereas FIG. 3B shows a landscape that the terminal body is horizontally disposed. The display unit 151 may be configured such that an output screen is converted according to an arrangement direction of the terminal body.

FIG. 3B shows that a text input mode is operated in the mobile terminal. The display unit 151 is provided with an output window 151*a'* and an input window 151*b'*. Soft keys 151*c'* on which at least one of texts, symbols and numbers are displayed may be arranged at the input window 151*b* in plurality in number. Once the soft keys 151*c* are touched, numbers, etc. corresponding to the touched soft keys are displayed on the output window 151*a*. The soft keys 151*c'* may be arranged in the form of QWERTY keys.

Once the soft keys 151*c'* are touched through the touch pad 135 (refer to FIG. 2B), texts, numbers, symbols, etc. corresponding to the touched soft keys are displayed on the output window 151*a'*. When compared with touch input through the display unit 151, the touch input through the touch pad 135 may prevent the soft keys 151*c'* from being blocked by a user's fingers. When the display unit 151 and the touch pad 135 are formed to be transparent, the user's fingers disposed on a rear surface of the terminal body can be recognized by the user's naked eyes. This allows the touch input to be more precise.

The display unit 151 or the touch pad 135 may be configured to receive touch input by a scroll as well as in the aforementioned manner. The user can move an entity on the display unit 151, such as a cursor or a pointer located on an icon, by scrolling the display unit 151 or the touch pad 135. Furthermore, when the user's fingers are to move on the display unit 151 or the touch pad 135, a moving path of the user's fingers may be visually displayed on the display unit 151. This may allow an image displayed on the display unit 151 to be effectively edited.

When the display unit 151 (touch screen) and the touch pad 135 are together touched within a predetermined time range, one function of the mobile terminal may be executed. The display unit 151 (touch screen) and the touch pad 135 are together touched when the user clamps the terminal body with using his or her thumb and index finger. Said one function of the mobile terminal may include activation or deactivation of the display unit 151 or the touch pad 135.

The proximity sensor 141 of FIG. 1 will be explained in more detail with reference to FIG. 4.

Figure 4:
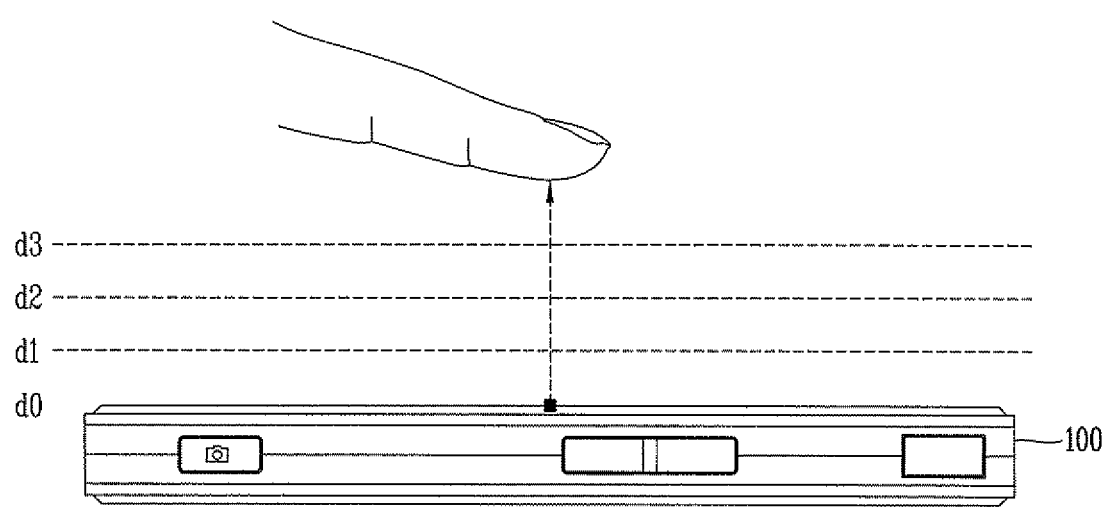
FIG. 4 is a conceptual view showing a proximity depth measured by a proximity sensor.

FIG. 4 is a conceptual view showing a proximity depth measured by a proximity sensor.

As shown in FIG. 4, when a pointer such as the user's finger or a pen is approaching to the touch screen, the proximity sensor 141 disposed in the touch screen or near the touch screen detects the pointer thus to output a proximity signal.

The proximity sensor 141 may be configured to output different proximity signals according to a distance between the pointer approaching to the touch screen and the touch screen (hereinafter, will be referred to as 'proximity depth').

FIG. 4 shows a sectional surface of the touch screen having a proximity sensor for sensing three proximity depths. Here, the proximity sensor may serve to sense proximity depths less than three, or more than four.

More concretely, when the pointer completely contacts the touch screen with a distance of 'd0', the controller recognizes the proximity distance as contact touch. When the pointer is spacing from the touch screen with a distance less than 'd1', the controller recognizes the proximity distance as proximity touch of a first proximity depth. When the pointer is spacing from the touch screen with a distance more than 'd1' and less than 'd2', the controller recognizes the proximity distance as proximity touch of a second proximity depth. When the pointer is spacing from the touch screen with a distance more than 'd2' and less than 'd3', the controller recognizes the proximity distance as proximity touch of a third proximity depth. When the pointer is spacing from the touch screen with a distance more than 'd3', the controller recognizes that the proximity touch has been released.

The controller 180 may recognize the proximity touch as various input signals according to a proximity depth and a proximity position of the pointer, and may perform various operational controls according to the various input signals.

FIG. 5 is a conceptual view showing a method for controlling a touch operation in an overlapped state between one pair of display units.

The mobile terminal of FIG. 5 is a folder type of mobile terminal in which a folder is folded or unfolded with respect to a body. The display unit 155 mounted to the folder may be a light transmissive type such as TOLED or a transparent type. And, a second display unit 156 mounted to the body may be a light non-transmissive type such as an LCD. The first and second display units 155 and 156 may be implemented as touch screens on which touch signals can be input.

For instance, when touch (contact touch or proximity touch) applied to the first display unit or the TOLED 155 is sensed, the controller 180 may control at least one image on a list displayed on the TOLED 155 to be selected or run according to a touch type and a touch duration.

Hereinafter, based on input methods such as touch, long-touch, and long & drag, will be explained a method for controlling information displayed on another display unit or the LCD 156 when the TOLED 155 exposed to outside in an overlapped state between the body and the folder is touched.

In the overlapped state (closed state of the mobile terminal), the TOLED 155 is disposed below the LCD 156 so as to overlap the LCD 156. Under this state, when touch for controlling images displayed on the TOLED 155, and other type of touch such as long touch (e.g., touch for 2~3 seconds) is sensed, the controller 180 controls at least one image of a list displayed on the LCD 156 to be selected according to the sensed touch. A result of executing the selected image may be displayed on the TOLED 155.

The long touch may be used even when a desired entity of entities displayed on the LCD 156 is selectively transferred to the TOLED 155 without an executing operation. That is, when the user applies long touch to one region of the TOLED 155 corresponding to a specific entity of the LCD 156, the controller 180 controls the entity to be transferred to the TOLED 155 to be displayed. Here, the entity displayed on the TOLED 155 may be transferred to the LCD 156 to be displayed according to touch input onto the TOLED 155, e.g., flickering, swirling, etc. In FIG. 5, a second menu displayed on the LCD 156 is transferred to the TOLED 155 to be displayed.

In the case of long & drag touch, the controller 180 may control a preview screen for an image selected by long touch to be displayed on the TOLED 155. In FIG. 5, a preview screen of the second menu (image file) showing a man's photo has been displayed.

In a state that the preview screen has been displayed, if the user drags other image on the TOLED 155 with maintaining the long touch of the selected image, the controller 180 moves a selection cursor (selection bar) of the LCD 156. And, the controller 180 displays an image selected by the selection cursor (woman's picture) on a preview screen. Then, when the long & drag touch is ended, the controller 180 displays the initial image selected by the long touch.

The long touch, and the long & drag touch may be equally applied when sliding is sensed together with long proximity touch (proximity touch for 2~3 seconds) for the TOLED 155. Here, the slide indicates an operation of proximity touch corresponding to the drag.

When touch rather than the aforementioned ones is sensed, the controller 180 may operate the touch in the same manner as a general touch method.

A method for controlling a touch operation in the overlapped state may be applied to a mobile terminal having a single display unit. The method may be also applied to a folder type of terminal having a dual display unit.

Hereinafter, a control method for the mobile terminal will be explained in more detail with reference to the attached drawings. Preferred embodiments to be later explained may be used in an individual manner or in a combined manner with each other. The preferred embodiment to be later explained may be combined with the user interface (UI).

The mobile terminal according to the present invention is provided with any web browser, and is accessible to wireless Internet. Once the web browser is executed, a default web page (hereinafter, will be referred to as 'home page') set to an environment setting option (not shown) thereof is automatically displayed. A user may open a web page of an address directly input to an address window of the web browser, or a web page of at least one of a plurality of addresses registered to a bookmark. If any popup windows are set to the web page, the popup windows are displayed on an upper layer of the main web page.

Figure 6:
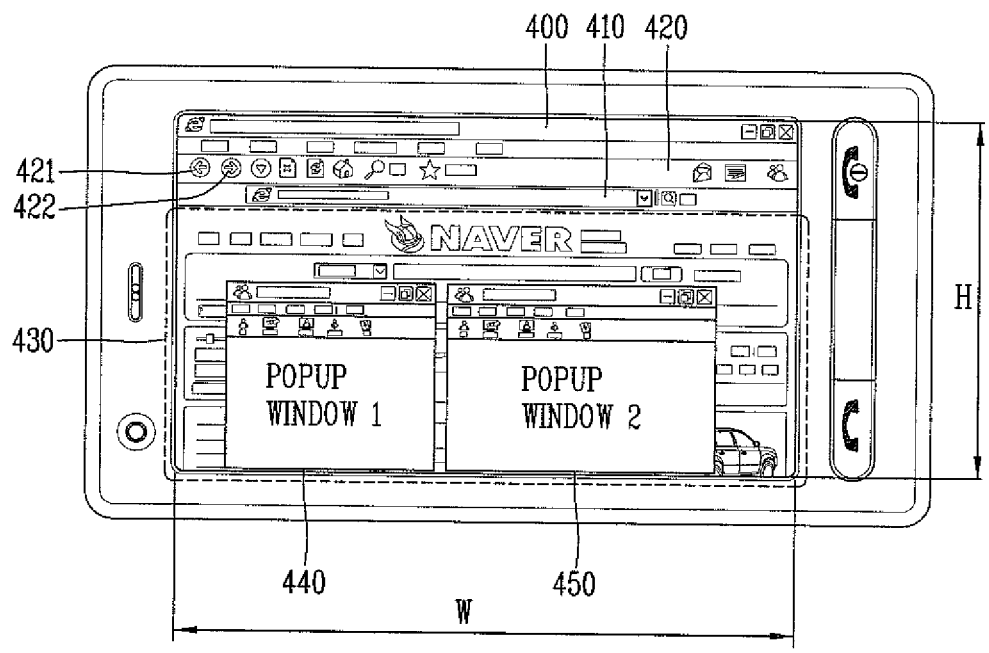
FIG. 6 is an exemplary view showing a web browser of the mobile terminal according to the present invention.

FIG. 6 is an exemplary view showing a web browser of the mobile terminal according to the present invention.

The web browser 400 is provided with an address input window 410 for inputting an address of a web page, and a plurality of function button display regions 420 for web surfing. The function button regions include a button 421 for displaying a previous web page (e.g., first web page) to the current web page (e.g., second web page), and a button 422 for displaying a next web page (e.g., third web page) to be opened subsequently to the current web page. Hereinafter, buttons relating to specific functions provided from a web browser will be explained.

Generally, a web page has a horizontal length of at least 800 pixels. Accordingly, a user has no inconvenience in viewing a web page through a monitor having a size of a horizontal length (W: at least 800 pixels) and a vertical length (H: at least 600 pixels). However, the vertical length of the web page composed of at least 600 pixels has to undergo a scroll process.

According to a recent trend, a display module of a mobile terminal that can implement a full browsing has horizontal resolution corresponding to 800 pixels. However, the display module has vertical resolution corresponding to 450 pixels less than 600 pixels of a general monitor. This may cause a user to scroll a web page in a vertical direction so as to view the entire parts of the web page in the same manner as a general monitor. Accordingly, it may be inferred that inconveniences due to the scrolling are not always caused from a mobile terminal having a small display module.

One of the most complicated problems that may occur at the time of performing web browsing by using a display module having a vertical length shorter than a horizontal length is related to display of popup windows.

Firstly, rather than each kind of information display regions 400, 410 and 420 applied to the web browser, another display region 430 (a substantial region for displaying the web page) has a vertical length of 350 pixels. Therefore, in an assumption that popup windows 440 and 450 have a size of 200*200 pixels, most of parts of the display region 430 of the web page may be blocked by the popup windows.

Secondly, popup windows automatically opened when the web page is opened almost include advertisements having no direct relation with a user. This may cause the user not to immediately start his or her desired task (e.g., information search) when the popup windows are opened on the web page. In this case, the user has to check contents on the popup windows before executing the task, and then has to delete or minimize the popup windows.

The user may prevent all the popup windows from opening on the web page by using an environment setting option (not shown) of the web browser. However, since there may be any popup windows absolutely necessary to the user among the popup windows, the user should not prevent all of the popup windows from opening.

Accordingly, the present invention is to provide a mobile terminal and a control method thereof capable of allowing a user to selectively display his or her desired popup window, after the user has completed his or her desired task on a web page after automatically hiding popup windows displayed when opening the web page.

FIG. 7 is a flowchart showing a method for hiding popup windows displayed when a web page is opened according to the present invention.

The mobile terminal according to the present invention may access to any web page through wireless Internet (S101). The controller 180 displays the web page on a preset region (web page display region) 430 of a web browser (S102). The controller 180 may access to wireless internet through the wireless communication unit 110.

Then, the controller 180 judges whether any popup windows exist when displaying the web page (S103). If there are any popup windows as a result of the judgment, the popup windows are displayed in a virtual space (S104). That is, in the present invention, the popup windows are not prevented from being displayed, but information relating to the popup windows are displayed in a virtual space. Accordingly, the popup windows are not substantially displayed on the display module.

Here, the virtual space may indicate any memory region.

More concretely, in an assumption that a specific memory region where information to be output to the display module 151 is stored is a first memory region, any memory regions may be referred to as a second memory region. And, display information relating to the popup windows may be stored in the second memory region.

That is, all information to be displayed on the display module is stored in the first memory region, whereas popup window-relating information not to be immediately displayed is stored in the second memory region.

When the popup windows are displayed in any virtual space not on the display module, the controller 180 may automatically display information (e.g., indicator) indicating at least one popup window exist in the virtual space (S105). That is, the controller 180 may display information indicating hidden popup windows exist. The information indicating hidden popup windows exist may be automatically displayed, or may be displayed according to a user's call.

And, the controller 180 may display information inside the first memory region as a default, and may display information (e.g., popup windows) inside the second memory region (virtual space) upon receipt of a user's commands (S107). The user's commands may be received through the user input unit 130.

While displaying information inside the first memory region, the controller 180 may display information (e.g., popup windows) inside the second memory region in an overlay manner (or mixing manner) upon receipt of a user's commands. Alternatively, upon receipt of a user's commands, the controller 180 may display either information inside the first memory region or information inside the second memory region on an entire screen in a switching manner.

Figure 8A:
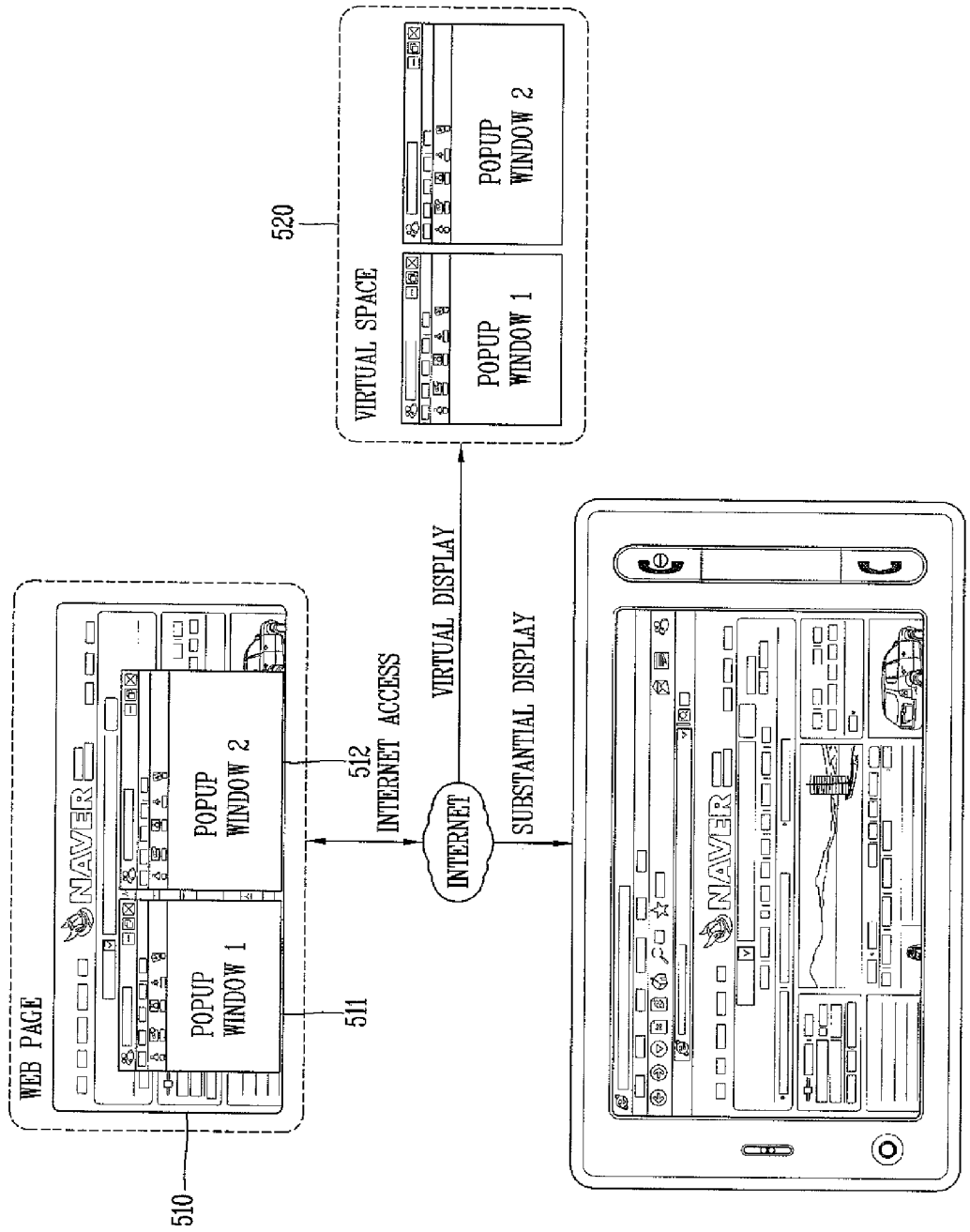
FIGS. 8A and 8B are exemplary views showing a method for hiding popup windows in the mobile terminal according to a first embodiment of the present invention.
Figure 8B:
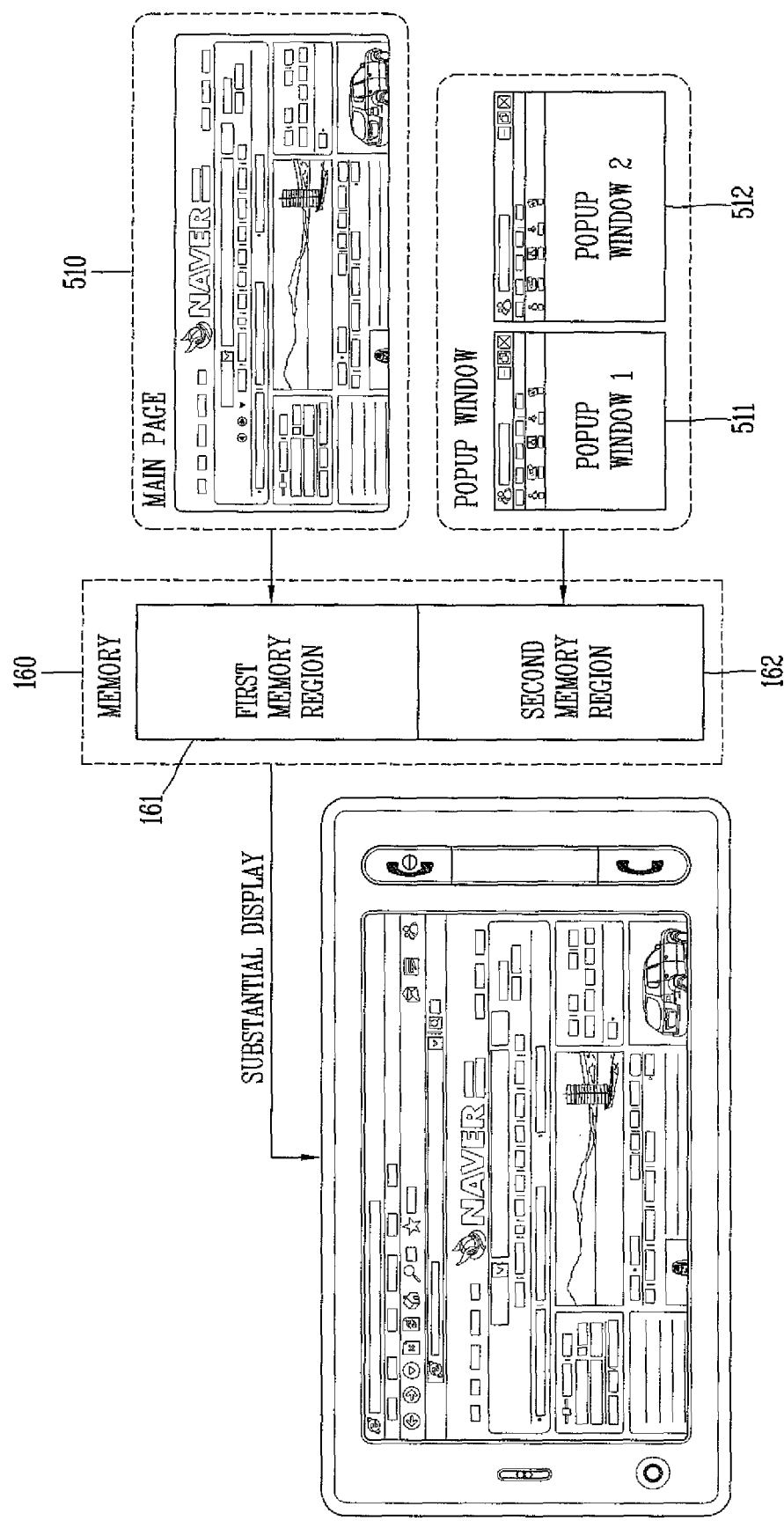

FIGS. 8A and 8B are exemplary views showing a method for hiding popup windows in the mobile terminal according to a first embodiment of the present invention.

As shown in FIG. 8A, when any web page 510 is to be displayed by using a web browser, if popup windows 511 and 512 to be displayed together with the web page exist, the controller 180 may display the popup windows 511 and 512 in any virtual space 520. Here, the virtual space may indicate any memory region.

As shown in FIG. 8B, the memory 160 of the present invention may be divided into a first memory region 161 for storing information relating to the web page 510 to be output to the display module 151, and a second memory region 162 for storing information relating to the popup windows.

Accordingly, the virtual space may indicate the second memory region.

In the present invention, when there exist any popup windows 511 and 512 at the time of displaying the web page 510, the controller 180 may automatically store information relating to the popup windows in the second memory region 162.

The information relating to the popup windows stored in the second memory region is not displayed together with the web page when displaying the web page. Since the user displays the popup windows stored in the second memory region (virtual space) after completing his or her desired tasks on the web page, the user's convenience is enhanced.

Since information relating to display of the popup windows is pre-stored in the second memory region, it can be displayed anytime according to the user's commands. Here, the popup windows-related information may include shapes of the popup windows, and all contents inside the popup windows to be output.

When the user instructs the displayed popup windows to be deleted, the controller 180 may delete the popup windows-related information stored in the virtual space (or second memory region). When the user instructs the displayed popup windows to be minimized or hidden, the controller 180 may maintain the popup windows-related information stored in the virtual space.

Figure 9:
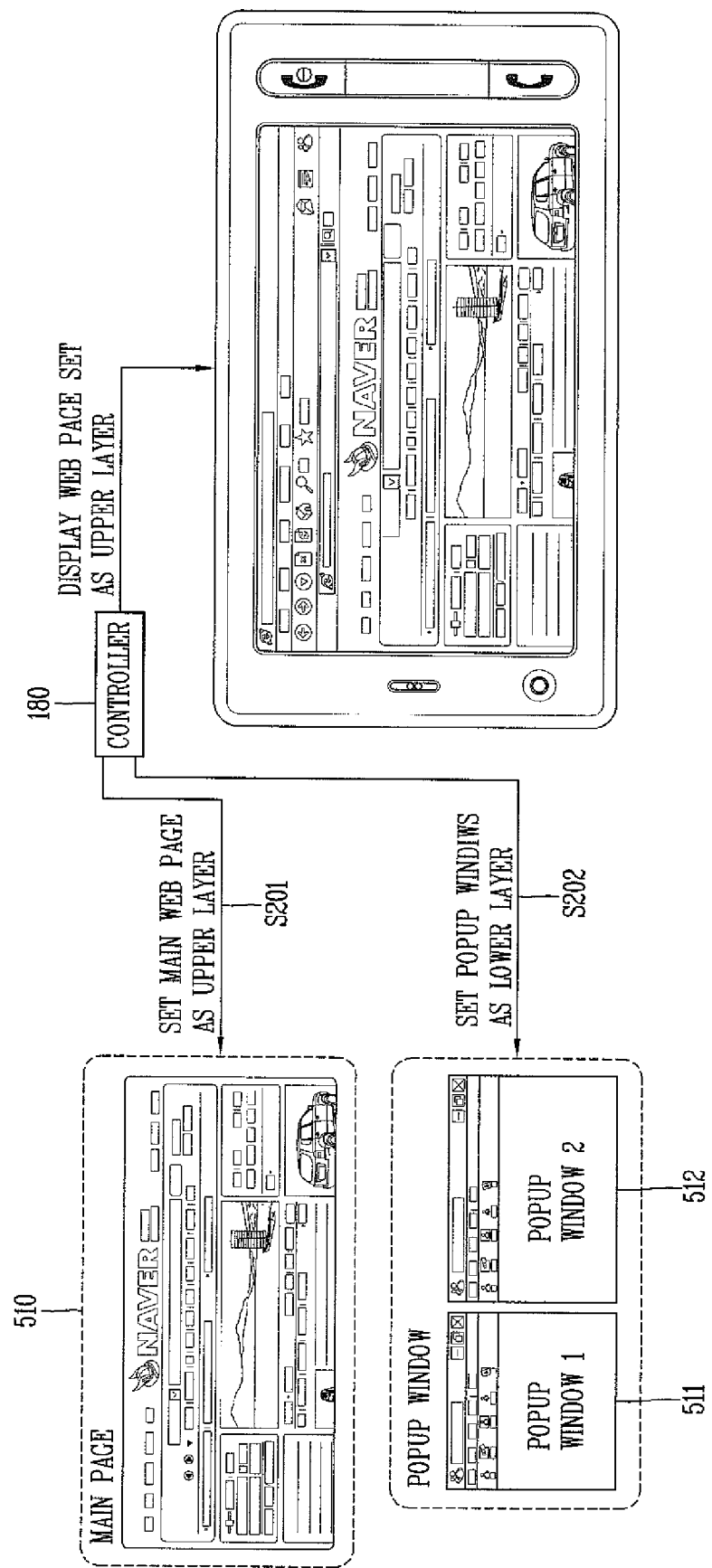
FIG. 9 is an exemplary view showing a method for hiding popup windows in the mobile terminal according to a second embodiment of the present invention.

FIG. 9 is an exemplary view showing a method for hiding popup windows in the mobile terminal according to a second embodiment of the present invention.

As aforementioned, when displaying the web page by using the web browser, the controller 180 may adjust display layers of the web page or the popup windows.

For instance, the controller 180 may set the main web page as an upper layer (S201), and may set the popup windows as a lower layer (S202). This may cause the popup windows set as a lower layer to be blocked by the main web page thus not to be viewed.

If the layer of the popup windows is changed to an upper layer, the popup windows may be immediately displayed.

The user may change the layer of the popup windows by using preset specific buttons or manipulations (e.g., proximity, gesture, voice commands, shake of the mobile terminal, etc.). Once the layer of the popup windows is changed to an upper layer, the popup windows are immediately displayed on the main web page.

Figure 10:
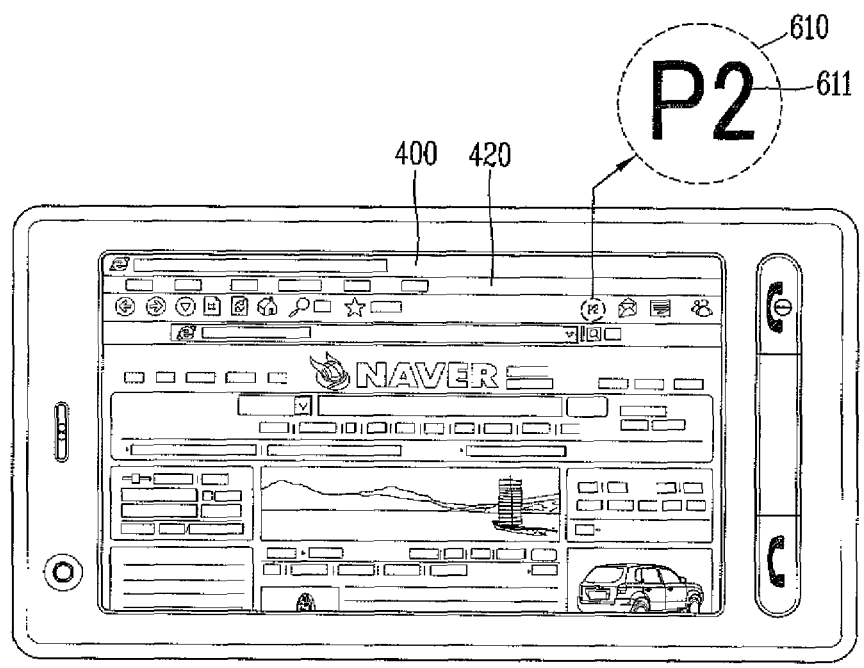
FIG. 10 is an exemplary view showing a method for displaying information indicating that popup widows exist in the mobile terminal according to the present invention.

FIG. 10 is an exemplary view showing a method for displaying information indicating that popup widows exist in the mobile terminal according to the present invention.

As aforementioned, when there exist any popup windows on the web page accessed by the mobile terminal, the popup windows may not be immediately displayed but may be hidden.

And, information indicating hidden popup windows exist, and information indicating the number of the popup windows may be displayed. The information indicating hidden popup windows exist may be displayed as an indicator 610 by using an image or a text. The indicator 610 may be displayed in a different form rather than the image or text.

In the preferred embodiment of the present invention, the indicator may be hidden, or may be displayed according to a user's commands. Methods for hiding or displaying the indicator are not to be explained in more detail for convenience.

The indicator may be displayed at one side of the function button display region 420 of the web browser. However, the position of the indicator is not limited to the function button display region 420. The indicator 610 may be displayed on an external region of the web browser 400. Also, one side of the display region may serve to display the web browser, and another side of the display region may serve to display the indicator 610. The indicator 610 may be displayed with overlapping the web browser.

The indicator 610 may be displayed only when there exist any popup windows.

The indicator 610 may be displayed in different ways according to whether any popup windows exist or not. For instance, different colors may be displayed, or different shapes may be displayed, or motion such as flickering may be implemented according to whether any popup windows exist or not. The indicator 610 may display numeric information 611 of hidden popup windows.

Figure 11:
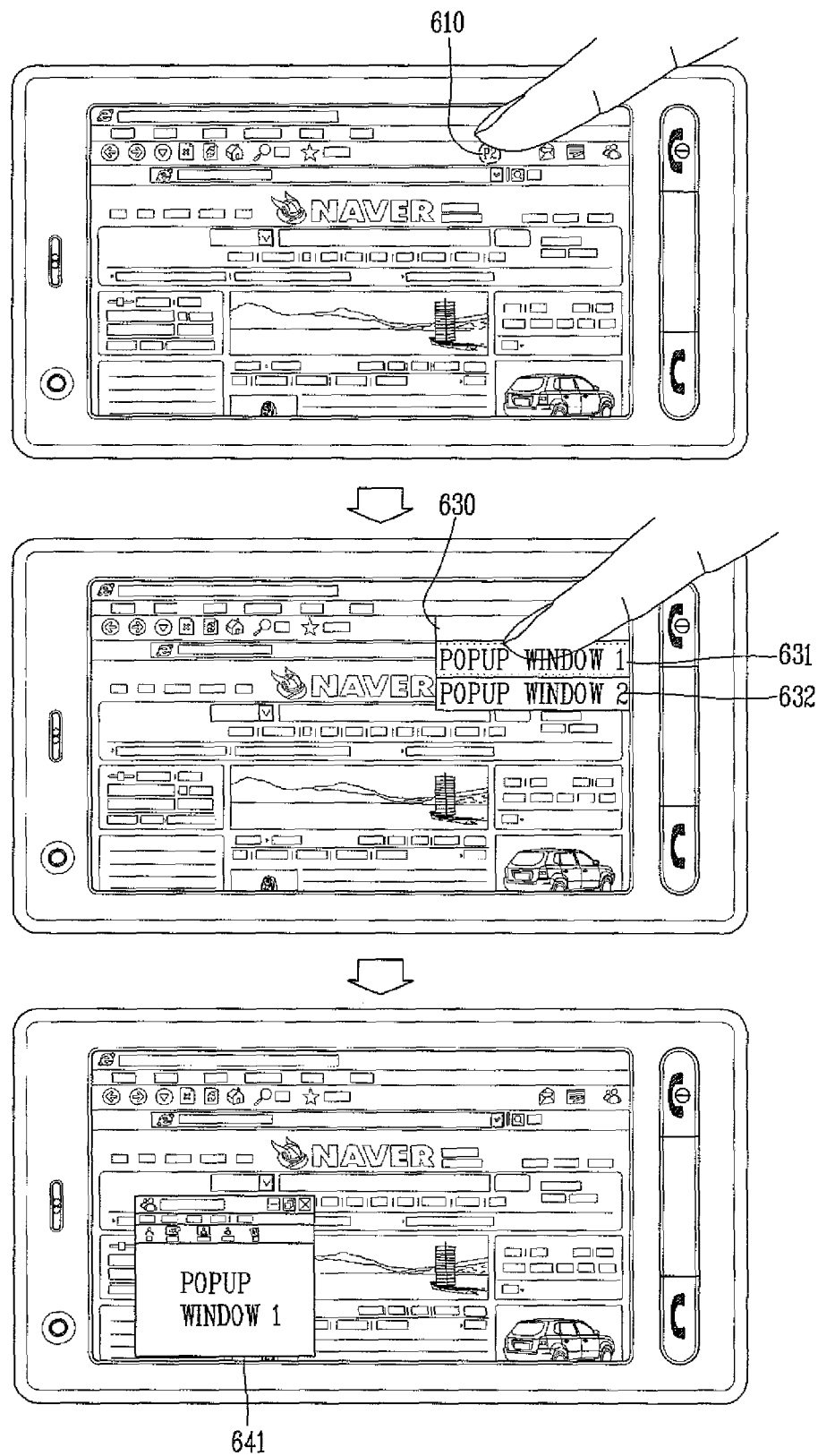
FIG. 11 is an exemplary view showing a method for displaying hidden popup windows at the time of executing web browsing in the mobile terminal according to the present invention.

FIG. 11 is an exemplary view showing a method for displaying hidden popup windows at the time of executing web browsing in the mobile terminal according to the present invention.

As aforementioned, when there are any popup windows on the web page accessed by the mobile terminal, the controller 180 may hide the popup windows and display information indicating that there exist any hidden popup windows. Hereinafter, the information indicating that there exist any hidden popup windows will be referred to as the indicator 610.

Once the user selects the indicator 610, the controller 180 may display a popup window list 630. The indicator 610 may be selected in a preset key or touch input manner. Alternatively, the indicator may be selected by using one of the aforementioned various input methods.

The popup window list may be displayed in various manners to be later explained.

If the user selects one popup window 641 from the popup window list 630, the controller 180 may display the selected popup window 641. The popup window 641 may be displayed on the web page in an overlay manner, or may be displayed on the entire screen without the web page. Here, the popup windows and the web page may be switched to each other according to the user's commands. That is, either the web page or the popup windows may be displayed on the entire screen.

Figure 12A:
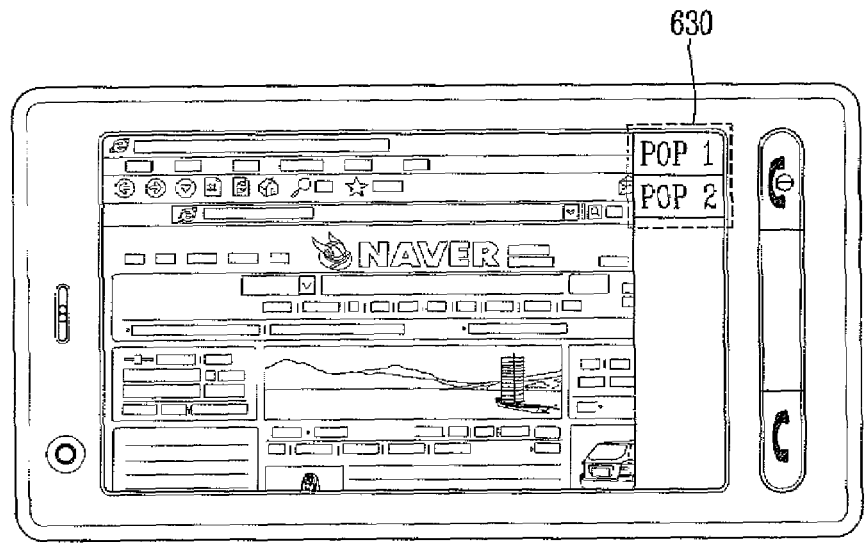
FIGS. 12A to 12C are exemplary views showing a method for displaying a list of hidden popup windows at the time of executing web browsing in the mobile terminal according to the present invention.
Figure 12B:
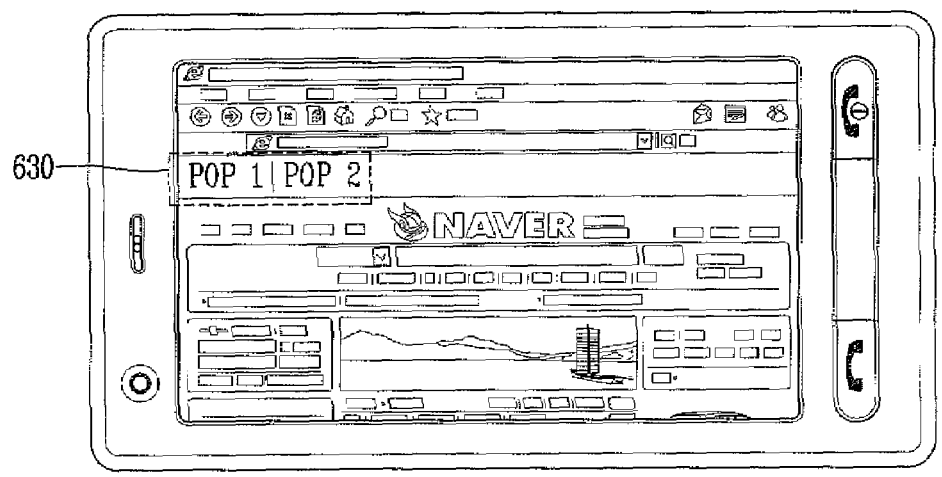
Figure 12C:
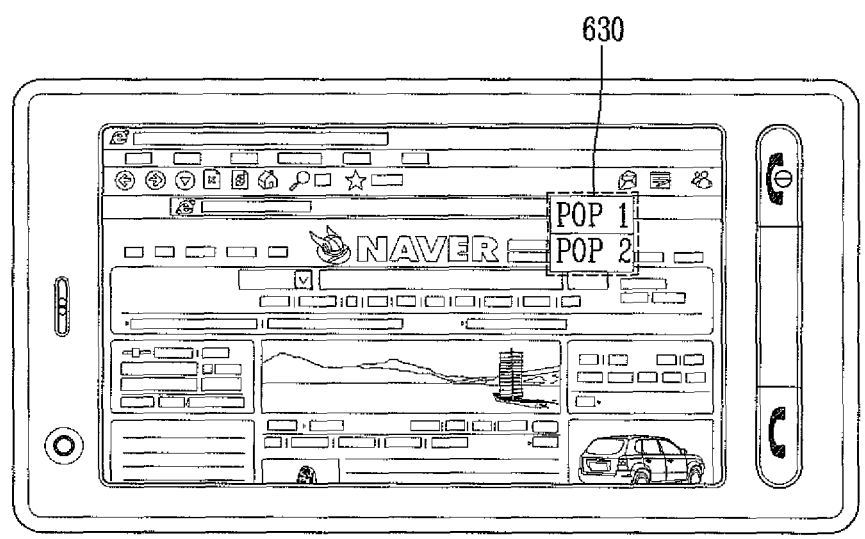

FIGS. 12A to 12C are exemplary views showing a method for displaying a list of hidden popup windows at the time of executing web browsing in the mobile terminal according to the present invention.

The mobile terminal according to the present invention may hide popup windows when executing web browsing. And, the mobile terminal may display information indicating that hidden popup windows exist, and may display a list of the hidden popup windows.

As shown in FIG. 12A, the web browser may be displayed on one of divided regions (e.g., upper, lower, right, or left regions)of the display region, whereas the popup window list may be displayed on another of the divided regions.

As shown in FIG. 12B, one side of the web browser (e, g., one side of the function button display region, or one side of the display region of the web page) is divided into a plurality of regions. And, the popup window list may be displayed on one of the divided regions.

As shown in FIG. 12C, in a state that one side of the display region or the web browser is not divided into a plurality of regions, the popup window list may be displayed at one side of the display region in an overlay manner.

The popup window list may be displayed on one side of the entire screen in a minimized size. The popup window list may display information (e.g., numbers) for selecting the respective popup windows.

The popup window list may also display information (e.g. colors, flickering) indicating whether the respective window popup windows have been opened by the user. For instance, popup windows having not been opened at all may be displayed in red or with flickering, and popup windows having been opened at least once may be displayed in blue or with no flickering.

Figure 13:
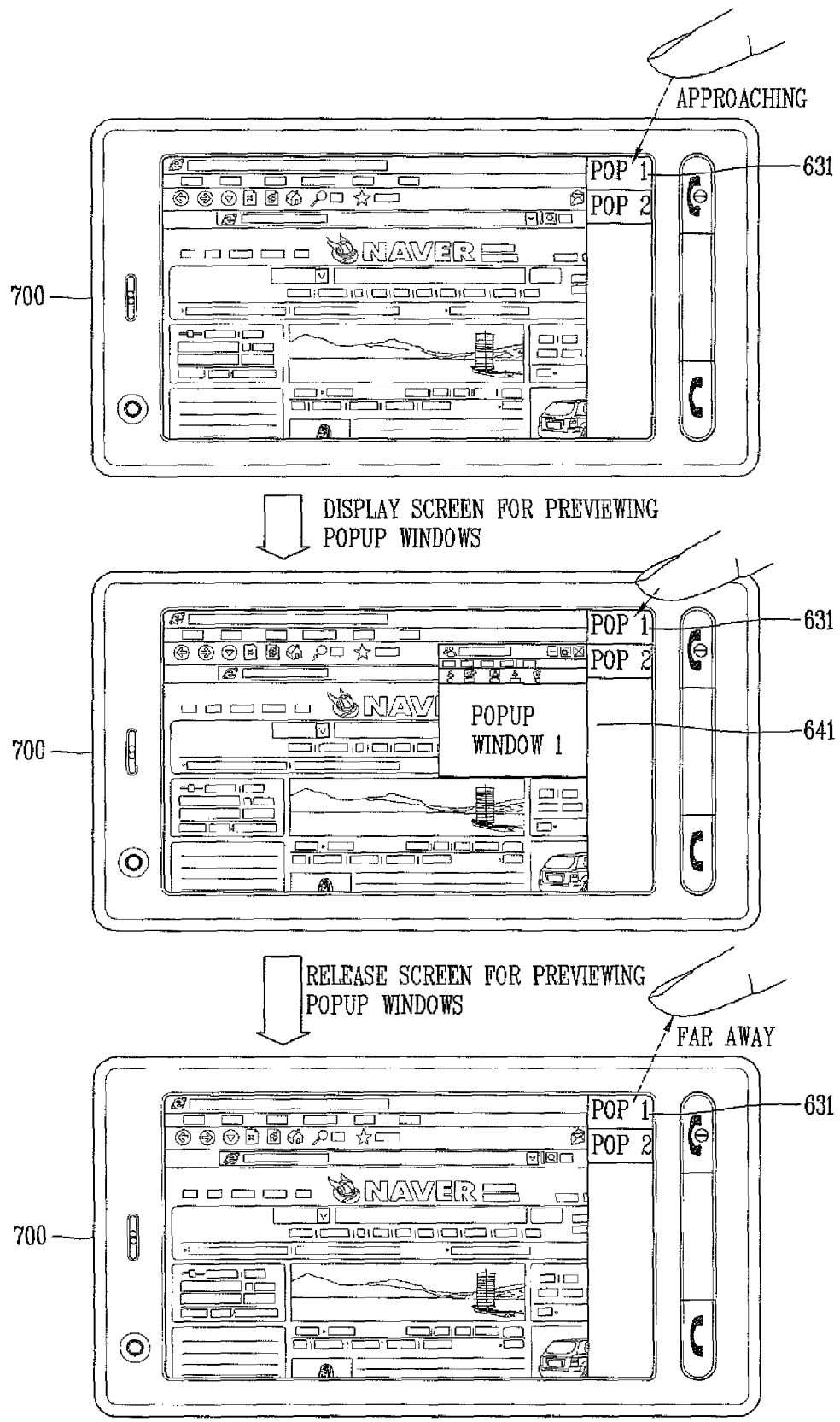
FIG. 13 is an exemplary view showing a method for displaying one popup window among a plurality of popup windows on a list in the mobile terminal according to a first embodiment of the present invention.

FIG. 13 is an exemplary view showing a method for displaying one popup window among a plurality of popup windows on a list in the mobile terminal according to a first embodiment of the present invention.

Once one popup window is selected from the popup windows list, the controller 180 may display the popup window. Here, the popup window may be displayed in a preview manner according to an input method for selecting the popup windows (e.g., proximity touch). The preview manner indicates a display method for automatically minimizing the popup window even if the user's additional commands for deleting or minimizing the popup window that has been displayed (e.g., preset commands in a specific form such as key input or touch input) are not input.

For instance, once the user's finger is approaching to any popup window item 631 on the list 630 (700), the controller 180 may display the popup window 641 in a preview manner (710). And, when the user's finger is far from the popup window item 631, the controller 180 may automatically release the popup window 641 displayed in a preview manner thus to minimize the popup window 641 (720).

When the user's finger touches the popup window item by more approaching thereto, the popup window may be displayed by a general method. The general method is a method for continuously displaying the popup window that has been displayed before the user's additional commands to delete or minimize the popup window are input.

Figure 14:
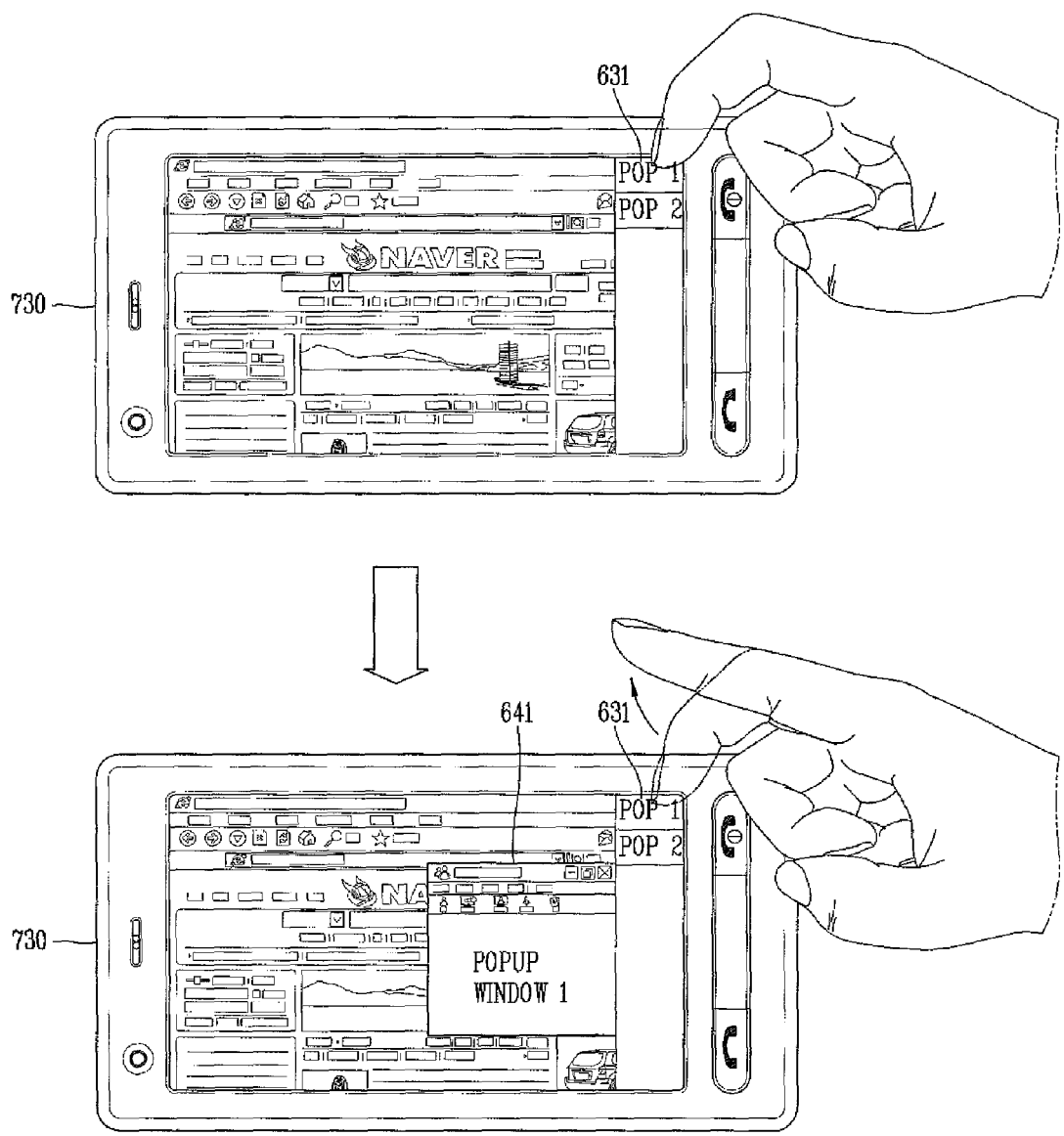
FIG. 14 is an exemplary view showing a method for displaying one popup window among a plurality of popup windows on a list in the mobile terminal according to a second embodiment of the present invention.

FIG. 14 is an exemplary view showing a method for displaying one popup window among a plurality of popup windows on a list in the mobile terminal according to a second embodiment of the present invention.

The popup window list may be displayed in a flickering or dragging manner. For instance, when an indicator indicating hidden popup windows exist is dragged or flickered in a specific direction, the controller 180 may display the popup window list in an unfolding manner in the specific direction (730).

When one popup window item 631 is selected from the popup window list and is flickered or dragged in a specific direction, the controller 180 may display the popup window 641 corresponding to the selected item in the specific direction (740).

The mobile terminal according to the present invention may hide popup windows when executing web browsing, and may display the hidden popup windows if necessary. Accordingly, the user's enhance may be enhanced.

In the present invention, one of the hidden popup windows may be selectively displayed, thereby enhancing the user's convenience.

The method for controlling the mobile terminal according to the present invention may be implemented in processor readable media having recorded programs thereon. The processor readable media may include random access memory (RAM), read-only memory (ROM), CD-ROM, a magnetic tape, a floppy disc, an optical data storage device, etc. The processor readable media may also include a carrier wave (e.g., transmission through Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a wireless communication unit configured to access a web page;
a display unit configured to display the accessed web page;
a proximity sensor configured to sense a presence of an object approaching a surface of the display unit; and
a controller configured to:
control the display unit to display the accessed web page;
control the display unit to display, on a region of the displayed web page, an indicator indicating presence of at least one popup window without displaying the at least one popup window;
control the display unit to display, upon selection of the indicator, a popup window identification (ID) list separately identifying each popup window indicated by the indicator;
control the display unit to display, upon selection via a contact touch of a popup window ID of the popup window ID list, a popup window corresponding to the selected popup window ID, wherein the contact touch comprises the object contacting a surface of the display unit; and
recognize the object sensed by the proximity sensor within a first distance from the surface of the display unit as a proximity touch,
wherein the popup window is displayed in a preview manner when the controller detects that the popup window is selected via the proximity touch,
wherein the popup window displayed in the preview manner ceases to be displayed when the proximity sensor senses the object moved away from the surface of the display unit to a distance greater than the first distance, and
wherein the popup window is displayed in a continuous manner when the popup window is selected via the contact touch.

2. The mobile terminal of claim 1, wherein the contact touch is performed by a flick input or a drag input in a specific direction.

3. The mobile terminal of claim 2, wherein the popup window corresponding to the selected popup window ID is displayed in the specific direction in response to the contact touch.

4. A method for controlling a mobile terminal, the method comprising:
accessing a web page via a wireless communication unit of the mobile terminal;
controlling a display unit of the mobile terminal, via a controller of the mobile terminal, to display the accessed web page;
sensing, via a proximity sensor of the mobile terminal, a presence of an object approaching a surface of the display unit;
controlling the display unit via the controller to display, on a region of the displayed web page, an indicator indicating presence of at least one popup window without displaying the at least one popup window;
controlling the display unit via the controller to display, upon selection of the indicator, a popup window identification (ID) list separately identifying each popup window indicated by the indicator;

controlling the display unit via the controller to display, upon selection via a contact touch of a popup window ID of the popup window ID list, a popup window corresponding to the selected popup window ID, wherein the contact touch comprises the object contacting a surface of the display unit; and recognizing, via the controller, the object sensed by the proximity sensor within a first distance from the surface of the display unit as a proximity touch, wherein the popup window is displayed in a preview manner when the controller detects that the popup window is selected via the proximity touch, wherein the popup window displayed in the preview manner ceases to be displayed when the proximity sensor senses the object moved away from the surface of the display unit to a distance greater than the first distance, and wherein the popup window is displayed in a continuous manner when the popup window is selected via the contact touch.

5. The method of claim 4, wherein the contact touch is performed by a flick input or a drag input in a specific direction.

6. The method of claim 5, wherein the popup window corresponding to the selected popup window ID is displayed in the specific direction in response to the contact touch.

* * * * *